Aug. 23, 1949.  W. C. JORDAN  2,479,841
TRACTOR POWER LIFT ATTACHMENT

Filed Jan. 19, 1946  3 Sheets-Sheet 1

Inventor:
William Clayton Jordan
By Paul Eaton
Attorney

Aug. 23, 1949.    W. C. JORDAN    2,479,841
TRACTOR POWER LIFT ATTACHMENT
Filed Jan. 19, 1946    3 Sheets-Sheet 2

Inventor:
William Clayton Jordan

By
Attorney

Aug. 23, 1949. W. C. JORDAN 2,479,841
TRACTOR POWER LIFT ATTACHMENT
Filed Jan. 19, 1946 3 Sheets-Sheet 3
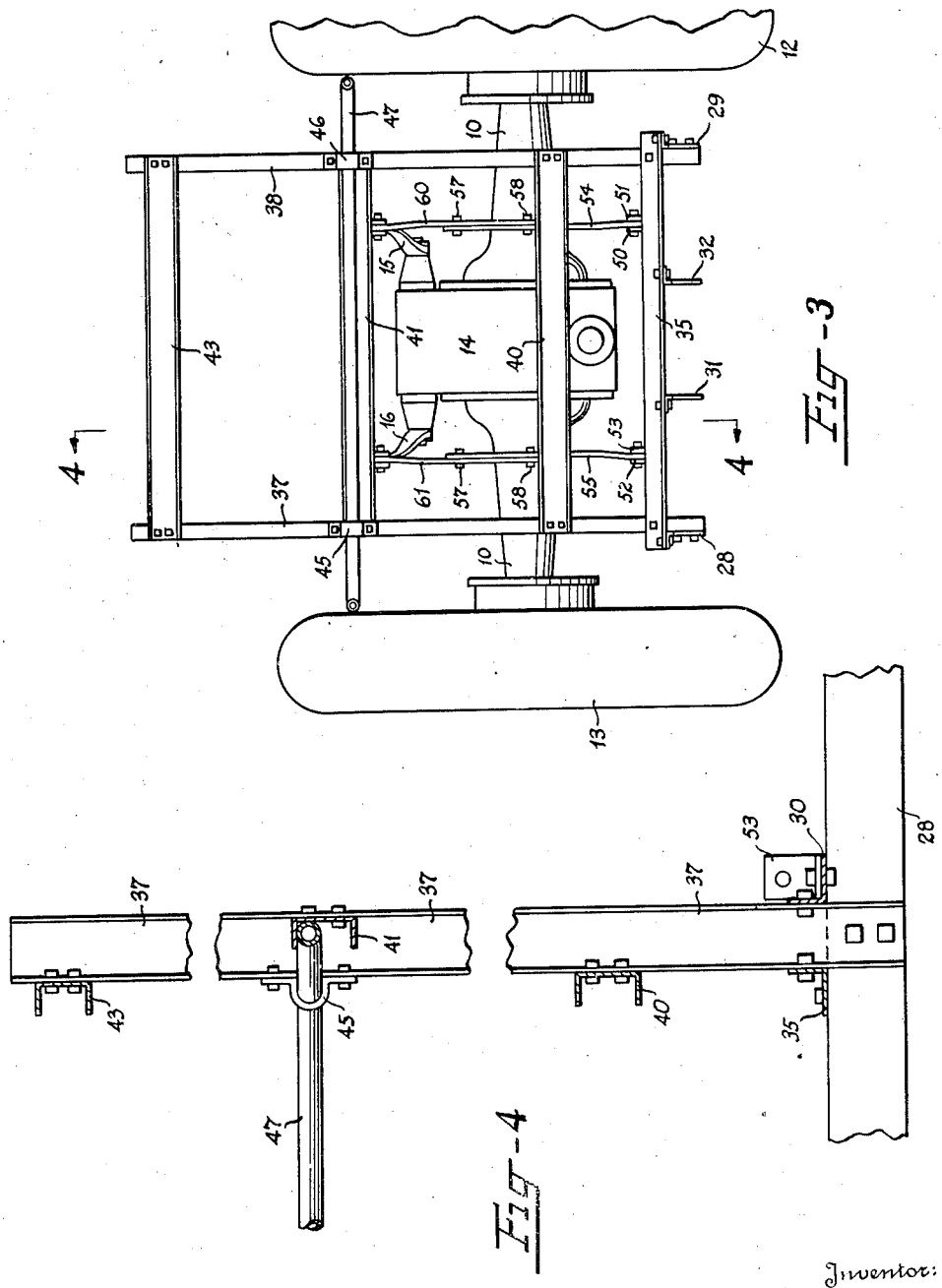
Inventor:
William Clayton Jordan Patented Aug. 23, 1949

2,479,841

UNITED STATES PATENT OFFICE 2,479,841

TRACTOR POWER LIFT ATTACHMENT

William Clayton Jordan, Blakely, Ga.

Application January 19, 1946, Serial No. 642,304

1 Claim. (Cl. 214—131)

This invention relates to an attachment which is adapted to be attached to tractors having a power lift and which is adaptable for the transportation of peanut stacks, hay ricks, hay shocks, and the like.

In the gathering of peanuts, they are uprooted and placed into small stacks for drying after which they have to be transported to a barn or the like where they are processed through a peanut picker which picks the peanut pods with the nuts therein from the stalks; and it has heretofore been quite a proposition to transport these ricks or small stacks of peanut vines with the nuts, resulting in shaking many of the nuts loose by picking up the stacks with a pitch fork, that is, a small amount at a time, and loading it onto a wagon, truck, and the like. Also, in gathering hay, many times it is placed into small cocks or shocks and, later, these are gathered up by hand by sticking a pitch fork into the shocks and taking them piecemeal and depositing them onto a truck, wagon, and the like. This old method shakes many of the leaves from the hay, thus lowering its quality.

It is an object of this invention to provide an apparatus adapted to be quickly attached to and detached from a tractor having a power lift and which apparatus extends rearwardly from the tractor so that the device can have its rearmost end lowered to the ground and the tractor can be backed to cause the prongs of the apparatus to pass beneath the stack to be transported and then the power lift can be actuated to raise the rear end of the apparatus to the desired height so it will clear the ground and any obstructions over which the tractor may pass. Thus, the stack can be transported to the place where it is to be processed or where it is to be deposited for storage by merely lowering the rack and moving the tractor forwardly to cause the stock to be deposited onto the ground or any other place where it is to be deposited, even in a barn in which case it would be deposited on the barn floor.

It is another object of this invention to provide a quickly attachable and detachable device to the rear end of a tractor for lifting and transporting stacks, shocks, and the like, from the field to a barn or other place of deposit and depositing the same. By having the attachment on the rear end of the tractor, the vision of the driver is not obscured and, in case of a failure of the power lift mechanism, there would be no danger of an accident on account of the prongs dropping into the ground.

It is another object of this invention to provide means projecting rearwardly from a tractor and connected to the hydraulic lift means of the tractor, for raising and lowering the rear end of the means which are pivoted to an intermediate portion of the tractor, whereby the rear end of the means may be lowered and the tractor backed to project the means underneath a stack of hay and like; and the lift means can then be operated to raise the stack off the ground and, in such position, the stack can be carried to any desired point where the means can be lowered onto the ground and the tractor advanced to withdraw the means from beneath the stack. This gives the important advantage of the weight of the stack being carried by the large rear wheels of the tractor, with a less likelihood of marring up; whereas, if the weight of the stack were carried by the front wheels which are smaller, the likelihood of this additional weight causing marring up of the small front wheels is apparent.

Some of the objects of the invention having been stated, other objects will appear as the description proceeds when taken in connection with the accompanying drawings, in which—

Figure 3 is a rear end elevation of the device showing it attached to the tractor;

Figure 4 is a vertical sectional view taken along the line 4—4 appearing in Figures 1 and 3.

Figure 1:
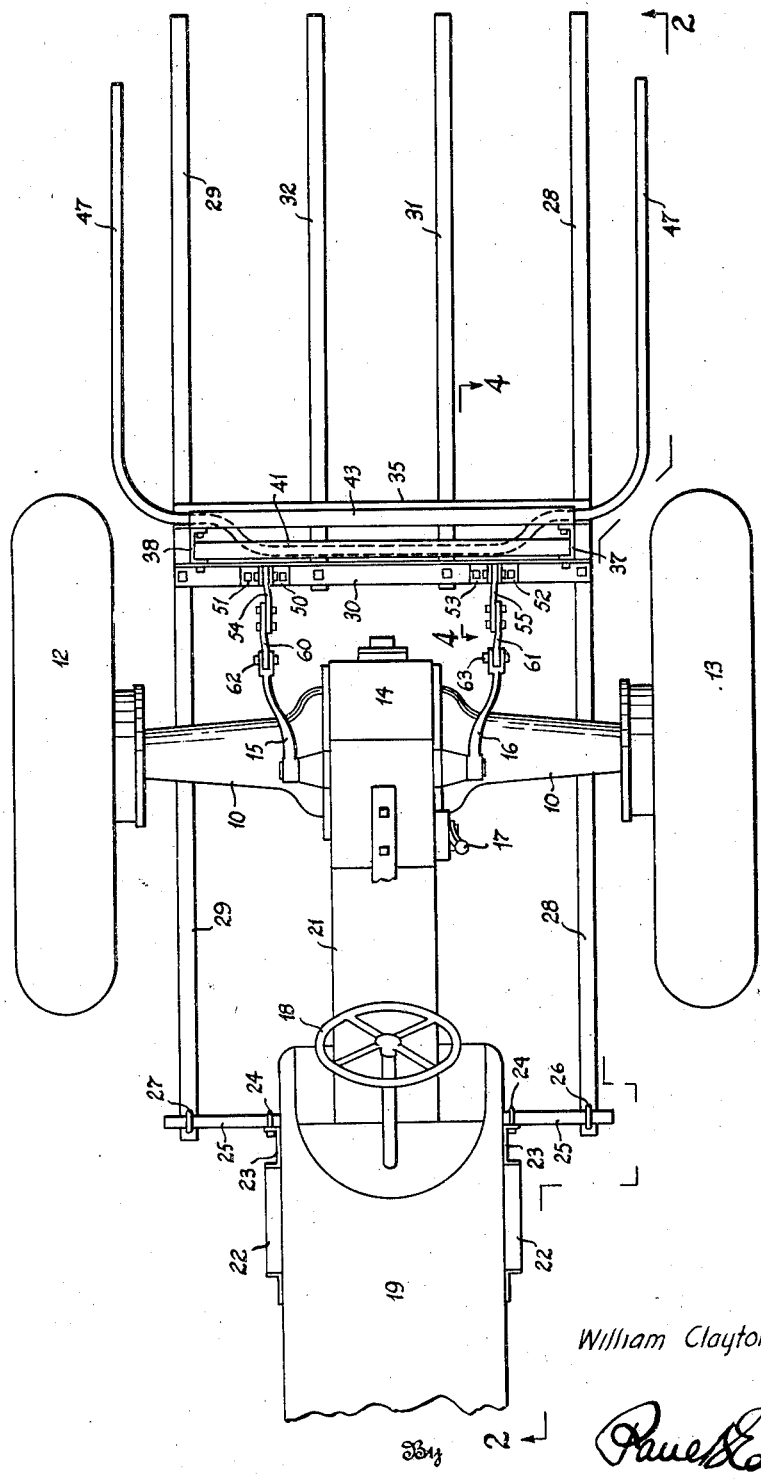
Figure 1 is a top plan of the apparatus showing it attached to the rear end of a tractor.

Referring more specifically to the drawings, the numeral 10 indicates a rear axle housing of a tractor having a driving axle 11 which drives the rear wheels 12 and 13. This axle housing has associated therewith a differential housing 14 which has associated therewith a pair of hydraulically operated lift arms 15 and 16. A suitable lever 17 is provided for controlling operation of the hydraulic lift arms 15 and 16. The tractor also has a steering wheel 18 and a conventional hood portion 19 covering the engine, not shown. The tractor also has suitable side bars 20 which are supported by the portion 21 which is integral with the differential housing 14.

It is with this conventional mechanism that I propose to use an improved device for lifting and transporting small stacks of hay, peanut vines, and the like. To the side frame members 20 of the tractor I secure on each side thereof braces 22 and 23, to which, by means of suitable U-bolts 24, I secure a transversely disposed pipe or rod 25. By means of other suitable U-bolts 26 and 27 I pivotally secure the front ends of side bars 28 and 29. These side bars 28 and 29 extend rearwardly beneath the axle housing of the tractor and to a point remote from the rear end of the tractor and are sharpened almost to a point at their extreme rear ends. Intermediate the ends of the side bars 28 and 29 I mount a cross member 30, and to the lower surface of this cross member 30 I secure other prongs or tines 31 or 32. These, with the side bars 28 and 29, provide four hay-lifting prongs, and I desire it to be understood that this number may be varied to suit different conditions.

To the top surface of side bars 28 and 29 I also secure a cross bar 35; and the upper surfaces of side bars 28 and 29 as well as intermediate bars 31 and 32 are secured to the lower surface of bar 35 as well as to the lower surface of bar 30. To the proximate or inner surfaces of side bars 28 and 29 I secure uprising bars 37 and 38 which bars have cross bars 40 and 41 secured thereto and span the distance therebetween. Also a top cross bar 43 is secured between the uprights 37 and 38. To the upright bars 37 and 38 I secure by means of brackets 45 and 46 a U-shaped pipe 47 which has its central portion fitting into the channel bar 41 as is clearly shown in the drawings. This prevents downward movement of the free ends of the U-shaped bar 47 and yet may permit swinging upward movement of this bar in case it strikes an object such as a stack of hay which may require that the rear ends of the U-shaped bar 47 move upwardly slightly.

On the top of the cross bars 30 I mount suitable lugs 50 and 51 and 52 and 53 between which pairs of lugs are pivotally secured links 54 and 55 and these links 54 and 55 have a plurality of holes 56 therein which are adapted to be penetrated by a pair of bolts 57 and 58 which are also mounted in two of a plurality of holes 59 disposed in links 60 and 61 whose upper ends are pivoted as at 62 and 63 in the free ends of lift levers 15 and 16.

Figure 2:
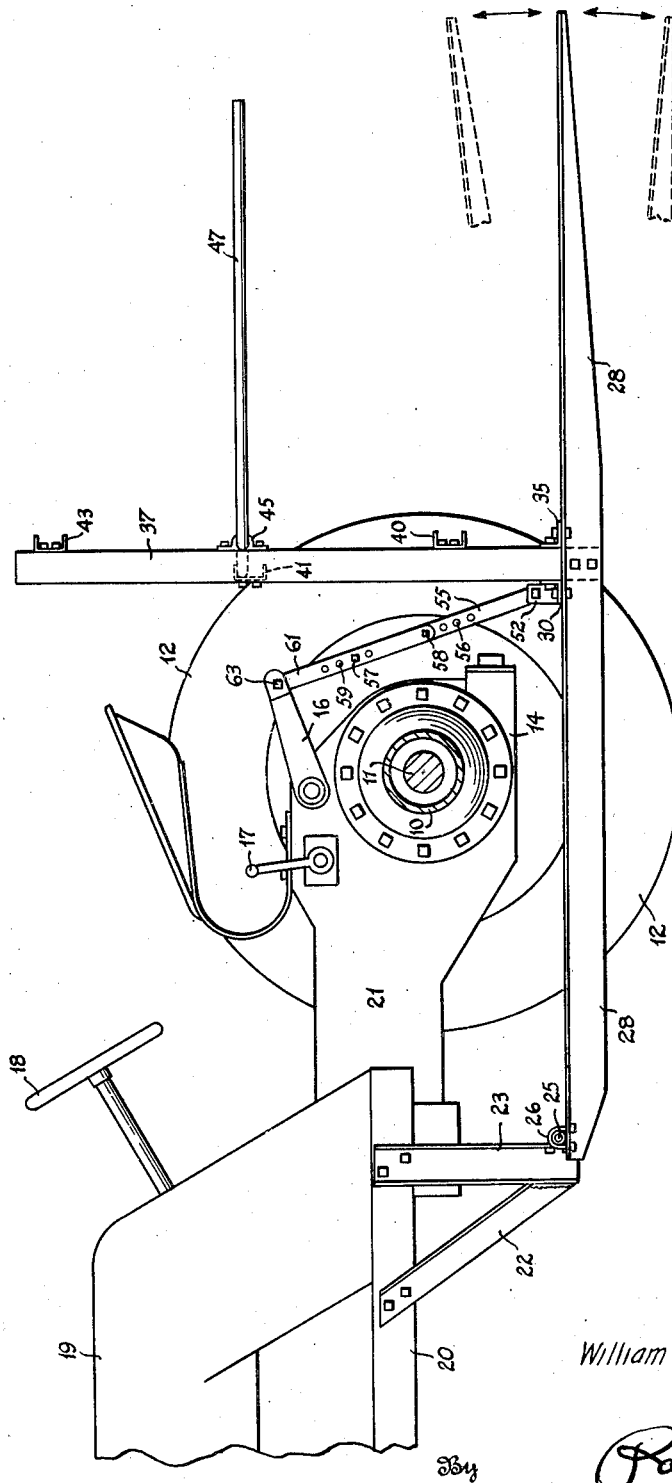
Figure 2 is an elevational view showing the tractor axle in section and being taken along the line 2—2 in Figure 1.

It is thus seen that by the operation of the hydraulic lift levers 15 and 16 the free ends of the bars 28, 29, 31, and 32 can be positioned, either as shown in Figure 2 or at any intermediate point between the two sets of dotted lines shown in Figure 2, to pick up a small stack of hay, peanut vines and the like and to raise it upwardly, say to the upper dotted line position shown in Figure 2, where it can be transported to the point of deposit without obscuring the vision of the driver of the tractor, and also without any danger of an unexpected lowering of the rack by the lift mechanism causing any damage whatever because it is disposed at the rear end of the tractor and not at the front end of the tractor.

In the drawings and specification there has been set forth a preferred embodiment of the invention, and although specific terms are employed, they are used in a generic and descriptive sense only, and not for purposes of limitation, the scope of the invention being defined in the claim.

I claim:

A rack for lifting and transporting stacks of vegetation adapted to be associated with a tractor having hydraulic lift arms and an elongated frame with a rear axle housing at the rear end of the frame, said frame having a cross piece secured thereto a substantial distance in front of the rear axle and disposed in a horizontal plane extending below the rear axle housing, a pair of side bars having their front ends pivotally secured to the cross bar and extending rearwardly beneath the axle housing and to a substantial distance beyond the rear side of the axle housing, a pair of angle bars transversely disposed secured to the side bars in spaced relation to each other and spanning the distance therebetween, a plurality of angle bars having their front ends secured to the lower side of said pair of angle bars and extending rearwardly in parallel relation to the side bars and stopping substantially flush with the rear ends of the side bars, a pair of channel bars secured at their lower ends to the side bars and disposed between the pair of angle bars and extending upwardly a substantial distance, a transverse channel bar secured to the front surfaces of the upright channel bars and being disposed at a higher elevation than the pair of angle bars, a second transverse channel bar secured to the rear webs of the upright channel bars and extending between the two upright channel bars, a pair of bearing members secured to the front surfaces of the upright channel bars, a substantially U-shaped member having a closed end resting beneath the upper angle of the second-named transverse channel bars and being bent laterally and then rearwardly to pass through the bearing members secured to the front surfaces of the upright channel bars and extending rearwardly a substantial distance and being disposed further apart than the side bars so as to pass on opposed sides of a stack of vegetation penetrated by the side bars and intermediate bars, the front one of the pair of angle bars secured on top of the side bars having a pair of links pivotally secured thereto and extending upwardly and having their upper ends adapted to be secured to the hydraulic lift arms of the tractor, said upright channel bars having a third transverse channel bar secured to the front surfaces thereof and near the tops thereof and spanning the distance therebetween, all of said transverse channel bars serving to limit the movement of the stack of vegetation relative to the rear axle of a tractor when a tractor is backed against a stack of vegetation.

WILLIAM CLAYTON JORDAN.

REFERENCES CITED

The following references are of record in the file of this patent:

UNITED STATES PATENTS

| Number | Name | Date |
| --- | --- | --- |
| 2,326,197 | Blecha | Aug. 10, 1943 |
| 2,379,797 | Gilbert | July 3, 1945 |
| 2,397,046 | Richey | Mar. 19, 1946 |
| 2,402,071 | Nehring | June 11, 1946 |
| 2,412,643 | Maki | Dec. 17, 1946 |
| 2,427,575 | Sedore | Sept. 16, 1947 |